United States Patent [19]

Schaidle et al.

[11] 4,028,271

[45] June 7, 1977

[54] BINDING RESIN FOR FOUNDRY SAND AND CATALYST THEREFOR

[75] Inventors: William J. Schaidle, Urbana; Patrick H. Stewart, Danville, both of Ill.

[73] Assignee: Core-Lube, Inc., Danville, Ill.

[22] Filed: Apr. 3, 1975

[21] Appl. No.: 564,854

[52] U.S. Cl. .......................... 252/429 R; 252/434; 252/436; 260/29.3; 260/38
[51] Int. Cl.² .................... B01J 27/02; B01J 27/12
[58] Field of Search ............... 252/429 R, 434, 436

[56] References Cited

UNITED STATES PATENTS

| | | | |
|---|---|---|---|
| 2,669,552 | 2/1954 | Seymour et al. | 252/436 X |
| 2,865,966 | 12/1958 | Abadir | 252/436 X |
| 3,497,488 | 2/1970 | Dawans et al. | 252/429 R X |

*Primary Examiner*—Patrick P. Garvin

*Attorney, Agent, or Firm*—Cushman, Darby & Cushman

[57] ABSTRACT

A phenol-formaldehyde resin composition and formulating process is described which is especially applicable for use as either a heat cured or as a room temperature curing binder for sand in the production of molds and cores for the foundry industry. By the use of an alkali metal sulfite such as $Na_2S_2O_4$ (sodium hydrosulfite) $NaHSO_3$ or $Na_2S_2O_3$ in the latter stages of resin formulation of the resole, a final product is obtained with excellent "through cure" characteristics and a high strength. The final cure of the phenol-formaldehyde resin or other acid catalyzed resins such as furan-formaldehyde is produced by a benzene or toluene sulfonic acid catalyst that includes a quantity of hydrofluoric or hydrofluorosilicic acid to thereby give additional binding strength when used for sand.

5 Claims, No Drawings

BINDING RESIN FOR FOUNDRY SAND AND CATALYST THEREFOR

The present invention is directed to a resin composition and the method of making same and to a acid catalyst therefore. The resin composition and catalyst system is specifically intended for use in the foundry industry as a binder for sand is used in making molds and cores. The catalyst for this class of resins and for other acid cured resins markedly improves bonding strength of the resins when the resins are used with foundry sands. The use of various binders for sand for foundry purposes is well known in the art and includes both inorganic and organic binding agents. Use has been made in the past of phenol-formaldehyde resins as a binder in the foundry industries. However, while usable, the prior phenol-formaldehyde resins had many shortcomings when compared to other types of binders. The present invention is directed to improvements in such phenol-formaldehyde resol resins and in the acid catalyst for curing same and for other acid catalyst cured substances such as the furan-formaldehyde resins.

A major consideration in all of the binder compositions that are used in the foundry industry is the cost of such binders. These costs include not only the raw costs of the binder substance itself, but the related costs such as the need for special handling equipment, the time factor involved in the curing of the mold to a state where it can be removed from the form and the ultimate strength of the molded sand body. This is to list only a limited number of the many cost considerations that are involved in selection of appropriate binders for the foundry industry. In addition, the usual factors of utility for a proposed application also have to be considered.

Phenol-formaldehyde as a curable resin for such use has attractive raw material price considerations over many of the other organic resins binding agents. However, theretofore, the phenol-formaldehyde resins have not possessed some of the other economic advantages of the competitive resins used for this purpose. In particular, the time required for a "through cure" setting of the sand mold has been excessive. By "through cure" is meant that a large section of sand sets as solidly in the center as at the outer edges without noticeable delay. "Through cure" is particularly a problem in the thicker cross section. The ultimate strength of the bonding resin has not been as high as is desirable. Through the present invention, a phenol-formaldehyde resin is produced which while retaining the low costs possible through phenol-formaldehyde usage, has good "through cure" characteristics and a tensile strength significantly above that of the prior art phenol-formaldehyde resins. The bonding strength of the resin, as with the other acid curing resins, is markedly improved by use of the catalyst of the invention.

The resin and acid catalyst of the invention may be used in either a no-bake or in a bake system including the Hot-Box system. As the no-bake system has many advantages, the invention will be described with particularity for this specific application.

By the present invention a larger quantity of water is contained in the phenol-formaldehyde resole resin than has heretofore been used for foundry applications. As a result, a low viscosity resin product is obtained which has good flow characteristics so as to readily coat the individual sand particles. The binder coated sand easily compacts as is desirable in the forming of the sand cores. In prior art phenol-formaldehyde resins for use in foundries as a binder for sand the amount of water included in the resin was severely limited by the tendency of the mix to separate into a water and water-resin phase of low percentage water and relatively high viscosity.

In accordance with one feature of the present invention, the resulting binder resin has very low free formaldehyde. This is desirable as odor of the formaldehyde in prior art phenol-formaldehyde resins has been a serious objection to their use in foundries.

The invention will now be described with particularity. While the description which follows will give a number of alternatives, it should be appreciated that various modifications of the concepts of the invention can readily be made and still lie within the teachings of the present invention. The specific resol phenol-formaldehyde is exemplary of the advantages attainable through use of the improved catalyst of the invention. Other phenol-formaldehyde resoles of the prior art have been found to improve in bonding strength through use of the fluoride catalyst of the invention.

PHENOL-FORMALDEHYDE RESOLE

A resole phenol-formaldehyde resin is produced as follows: There is placed in a reaction kettle a mixture comprising 55% by weight of phenol (98% conc.) with 45% by weight of a 50% formaldehyde in water. A more dilute solution of formaldehyde in water can be used producing similar results, such as the commercial 37% formaldehyde solution commonly used in the resin industry. Water may, if required, be vacuum distilled off to produce a resin with the desired amount of water remaining. The maximum amount of water allowable in the initial blend of phenol and formaldehyde will be determined by the reactivity of the phenol-formaldehyde-water mix. That is when a more dilute solution of formaldehyde in water is used, the excess water decreases the reactivity of the mix. It is therefore desirable to use at least the 37% solution of formaldehyde.

The mixture above gives a mole ratio of 1.28 to 1 formaldehyde to phenol. This ratio of formaldehyde to phenol is preferred as it gives the best final properties to the binder resin. However, broader ranges can be used for this ratio although the results will be inferior to those attainable with the preferred ratio given above. The functional limits of the mole ratio are 1.05 to 1.0 for the lower limit and 2.5 to 1 for the upper limit. Below 1.05 to 1.0 a novalak resin is produced, while above 1.5 to 1.0 a more noticeable formaldehyde odor and lower strength characteristic in the finished resin appears.

The initial blend of formaldehyde-phenol is heated to about 120° F at which time, powdered lithium hydroxide in a quantity of 0.125% by weight of the combined phenol and formaldehyde is added to the mixture. Lithium hydroxide is preferred, although sodium hydroxide and potassium hydroxid gives substantially the same results. As the reaction between the phenol and the formaldehyde is exothermic, the temperature of the batch is maintained by appropriate heat exchange means. The batch is maintained at 120° F for about 24 hours for slow reaction to occur. It is believed that the slow reaction favors production of monomer over polymers. This is important in the final results as it markedly affects the water solubility of the final resin. An additional quantity of 0.125% by weight lithium hydroxide is added 24 hours after the first addition. The temperature is maintained at about 120° F during this period of time. A third addition of 0.125% lithium hydroxide is added 16 hours after the second addition.

After each addition of lithium hydroxide, a pH of 7.6 and 8.5 is achieved. The pH range is maintained for approximately 6 hours after which time, the pH gradually decreases to about 7.6 pH. Control of pH during the reacting period is very important as the rate of polymerization and the exotherm of the reaction are determined in a large part by the pH of the mixture.

Following the reaction after the third addition of lithium hydroxide, the temperature of the batch is increased to about 140° F and the reaction is allowed to continued until only 3% to 4% of the original formaldehyde remains in the unreacted state. At this point, 0.5% by weight (of the phenol-formaldehyde mix) of sodium hydrosulfite ($Na_2S_2O_4$) is added to the reactor mixture and blended therein. The use of sulfite under the conditions of the process is essential to securing the good through cure characteristics desired.

The ideal percentage of $Na_2S_2O_4$ lies in the range of 0.1% to 0.5%. Less than .1% produces a resin with poorer through-set properties. A percentage higher than .5% produces a hydrogen sulfide odor in the final catalysation; the amount of odor increasing with increasing sodium hydrosulfite addition.

The other sulfites such as sodium sulfite and sodium bisulfite give similar results to that of sodium hydrosulfite. The range of quantities of each of these to be added in accordance with the invention will differ only slightly from $Na_2S_2O_4$ as corresponds to their molecular weights. The range of 0.1% to 0.5% applies for these as well.

The reason for the beneficial results attained by use of a sulfite are not understood. However, the addition is critical in achieving the desired results of the invention insofar as this specific phenol-formaldehyde resin is concerned. The addition of a sulfite is preferrably at the state given above. However, the sodium hydrosulfite may be added at an early stage of the reaction and in the same concentration and give substantially identical results to those in the preferred embodiment.

The temperature of the batch at this stage is maintained at about 140° F until a viscosity of 35–38 centipoises at 80° F is achieved. At this viscosity, the unreacted formaldehyde level is about 1.0% to 1.2%. When this viscosity is achieved, the reaction mixture is cooled to about 120° F and the reaction is allowed to continue for approximately 16 additional hours, at which time a viscosity of 45–48 centipoises 80° F is achieved.

It is possible to shorten the reaction time by increasing the temperature to a higher figure. For example, one may produce a similar resin by reaction at 170° F for 5 hours. Tests have shown that the quality of a resin so produced is lower for the intended purpose than is the case where the preferred procedure is followed although still superior to prior art phenol-formaldehyde resins use for binders in the foundry industry.

The now reacted resin is then neutralized with an acid such as formic acid. While formic acid is preferred, a wide variety of organic acids or inorganic acids will serve substantially the same purpose. When the viscosity is achieved the reaction mixture is cooled.

At this point a functional silane is added to the mixture in a quantity of about 0.2% by weight. A suitable silane for this purpose is gamma-amino proplytriethoxysilane available from Union Carbide Company under their designation A-1100. The now completed resole resin is cooled to a temperature below 90° F.

The purpose of the addition of functional silane is that such addition produces a large increase in the bond strength of the sand-resin mix.

The resulting phenol-formaldehyde resin properties include a viscosity below 65 centipoises at 80° F, and a water content of approximately 20% by weight. The low viscosity property aids in a better and more complete coating of the sane to produce higher tensile strength in the final sand resin product. The lower viscosity also results in better flow properties in the coated sand to give a dense sand-resin mix in the mold. Lower viscosity and higher water content can be obtained than the 20% indicated by lessening the cook time for the final stage. However, with higher water content, there is an increased tendency to separate the resin-water mix into a water layer and a water-resin solution layer upon prolonged standing.

On prolonged storage of the resins in accordance with the invention particularly for high water content, there is some tendency to break down into the water layer and the water-resin solution noted above. The reason for this is believed to be due to further polymerization on standing resulting information of higher molecular weight and thus less water soluble polymers.

This tendency is markedly reduced by adding to the resin mix a small quantity of an alcohol such as methyl alcohol. Additions up to 2% by weight decrease the tendency of separation of water. Quantities above this percentage have highly negative effects on the bonding strength of the resins. For best results the amount of methyl alcohol should be from about 0.5% to 2.0% by weight with about 1% of optimum. This latter concentration has minimal effect on resin strength while decreasing any tendency for separation of a water phase.

CATALYST FOR REACTION OF PHENOL-FORMALDEHYDE RESOLES

Benzene sulfonic acid (BSA) is the preferred catalyst for cure of the above phenol-formaldehyde resin. Toluene sulfonic acid (TSA) may also be used although with overall less desirable results.

Both the BSA and the TSA catalyst of the invention are comprised of a mixture of both water, methanol, and hydro-fluorosilicic acid or alternatively with hydrofluoric acid.

The hydro-fluorosilicic acid (2% by weight) is added to increase the tensile strength of the final sand, resin, catalyst mix. At the 2% level, the best tensile strength increase is obtained. However, through the entire range from .1% to 5.0% the tensile strength is markedly better than when no fluoride is used.

As a specific example catalyst for reaction can be prepared in the following proportions. Where BSA is specified one can also use TSA, although with slightly less satisfactory results.

| | |
|---|---|
| BSA (90% concentrate) | 68% by weight |
| Water | 10% by weight |
| Methanol | 20% by weight |
| $H_2SiF_6$ | 2% by weight |

The above values of BSA and solvent may be deviated from and accomplish substantially the same results. For example, dependent upon the desired rate of cure the BSA concentration may be somewhat higher (within solubility limits) for a faster cure and lower for a slower cure. The water and methanol (or other low molecular weight alcohol such as ethanol) are present solely as solvents. They may vary in accordance with the amount of water in the resin and the requirements of keeping the active ingredients in solution.

Alternatively, in place of the hydro-fluorosilicic acid one may use hydrofluoric acid in the same concentration to produce substantially the same results. However, use of hydrofluoric acid presents handling problems somewhat more troublesome than does fluorosilicic acid.

In certain instances, such as where the sand used has a high acid demand, inclusions of a quantity of sulfuric acid is desirable. For example, one may use a 3% addition of sulfuric acid to the catalyst above. Larger amounts should be avoided as they have an adverse effect on strength of the final resin binder.

BONDING SAND IN FOUNDRY

The discussion which follows is for use of the present invention in a typical application in a foundry for producing sand molds. It is not intended as a full treatise on variables of foundry practice nor as a substitute for the individual judgment of the ultimate user of the invention. The quantity of resin, catalyst and mixing conditions may be varied, as required, to meet special needs such as the ultimate bond strength desired, the temperature of the sand used, the type of sand used (shape of grains) the acid demand of the sand and the like.

The sand to be bonded was an Ottawa silica sand having an AFS fineness in the range of 30–120. Sand temperature was about 70° F. The quantity of sand to be made up was weighed and a quantity of the phenol-formaldehyde reacted mixture containing approximately 20% water and prepared in accordance with the process given above was measured out. Typically, 1 ¼% by weight of resin to the amount of sand produces a strong bond. Lesser or greater quantities can be used with corresponding decrease or increase in bonding strength.

Catalyst prepared in accordance with the formulation above was first mixed with the sand. The quantity of catalyst used will vary from about 20% up to about 80% of the weight of resin to be used. The quantity of catalyst used is dependent on factors such as the acid demand of the sand, the temperature of the sand and upon the rate of speed of cure desired. Under the sand conditions given above, the quantity of catalyst used was 30% by weight of the resin. After thoroughly mulling the catalyst into the sand the resin is added thereto and likewise, mulled. After mixing, the sand-resin catalyst mix is placed into the form, tamped or otherwise compacted and allowed to cure.

Comparative tests showed that the resin mix of the invention when cured with the fluoride containing catalyst gave a bond strength of the resin in the sand mold of from 25% to 50% higher than was the case were the catalyst of the same composition did not include fluoride. Excellent through cure of the sand molds was found compared with commercially available phenol-formaldehyde resins for use as binders for sand in foundry applications.

Samples of commercially available resoles of phenol-formaldehyde sold for use as binders for sand in the foundry industry were also tested with the catalyst of the present invention to determine the effectiveness of the fluoride containing catalyst. The samples used were obtained from the Ashland Chemical Company, under their designation Phenolic No-Bake Resin and from Borden Chemical Company, under their designation Phenolic No-Bake Resin. Cure of these commercial resins with the catalyst of the invention containing fluoride and without the fluoride were made. The same increase in bonding strength was found as noted above. That is, strength increased from 25% to 50% by use of the fluoride.

Other acid curing resins for foundry use show the same benefits from the use of fluoride containing catalysts of the present invention as curing agents therefore. For example, the furan-formaldehyde resins are one such class of acid curing resins that show improved strength as a binder for sand when used with the catalyst of the present invention.

Alternatively, a two channel system can be used wherein in one channel of the system one-half of the sand is mulled with the resin and in the other channel of the system the other half of the sand is mulled with the catalyst. The sand from each channel is combined in a third mulling channel to produce the sand-resin-catalyst mix.

What I claim is:

1. An acid catalyst for curing of resin-sand mixtures in the foundry industry comprising as the active ingredients thereof a mixture of an organic acid in a major amount said amount being effective for curing a resole phenolformaldehyde resin and selected from the group consisting of benzene sulfonic acid and toluene sulfonic acid and mixtures thereof; a solvent therefore, and from 0.1 to 5.0% by weight of an acid fluoride selected from the group consisting of hydrofluoric acid and fluorosilicic acid.

2. An acid catalyst in accordance with claim 1 wherein said fluoride is fluorosilicic acid in quantity of about 2% by weight.

3. An acid catalyst in accordance with claim 2 wherein said organic acid is benzene sulfonic acid in a quantity of about 70%.

4. An acid catalyst in accordance with claim 1 wherein said fluoride is hydrofluoric acid.

5. The acid catalyst in accordance with claim 1 including a quantity of sulfuric acid up to 3% by weight added thereto.

* * * * *